(12) United States Patent
Murashima

(10) Patent No.: US 8,386,675 B2
(45) Date of Patent: Feb. 26, 2013

(54) DATA TRANSMITTING APPARATUS AND DATA TRANSMITTING PROGRAM

(75) Inventor: Hiroshi Murashima, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1246 days.

(21) Appl. No.: 12/167,020

(22) Filed: Jul. 2, 2008

(65) Prior Publication Data

US 2009/0013101 A1      Jan. 8, 2009

(30) Foreign Application Priority Data

Jul. 3, 2007   (JP) ................. 2007-174956

(51) Int. Cl.
*G06F 13/12*    (2006.01)
*G06F 13/38*    (2006.01)
*H04N 1/32*     (2006.01)
*H04N 1/41*     (2006.01)
*H04N 1/00*     (2006.01)
*G06K 9/36*     (2006.01)
*G06K 9/46*     (2006.01)

(52) U.S. Cl. .......... 710/68; 382/232; 382/234; 382/276; 358/426.01; 358/426.02; 358/426.03; 358/426.04

(58) Field of Classification Search ...................... None
See application file for complete search history.

(56) References Cited

U.S. PATENT DOCUMENTS

| | | | | |
|---|---|---|---|---|
| 5,650,857 | A * | 7/1997 | Cole et al. | 358/296 |
| 5,815,097 | A * | 9/1998 | Schwartz et al. | 341/51 |
| 6,785,424 | B1 * | 8/2004 | Sakamoto | 382/244 |
| 7,447,384 | B2 * | 11/2008 | Kitora et al. | 382/305 |
| 7,860,322 | B2 * | 12/2010 | Lee et al. | 382/232 |

FOREIGN PATENT DOCUMENTS

| | | |
|---|---|---|
| JP | H05-270092 A | 10/1993 |
| JP | H10-191033 A | 7/1998 |

* cited by examiner

*Primary Examiner* — Kris Rhu
(74) *Attorney, Agent, or Firm* — Baker Botts L.L.P.

(57) ABSTRACT

There is disclosed a data transmitting apparatus for transmitting data including a plurality of data elements, each of which is a bit sequence of a plurality of bits. At least one bit in the bit sequence of a first one of the kinds of data elements that most frequently occurs has the same value as a bit at a corresponding place in the bit sequence of a second one of the kinds of data elements that second most frequently occurs. The datablock generating portion generates a data block, by rearranging the bit sequences of the data elements of the raw data such that bits at the same place in the respective bit sequences as each of the at least one bit are arranged in a series in the data block. The data compressing portion creates a compressed file. The transmitting portion transmits the compressed file.

18 Claims, 15 Drawing Sheets

FIG.6

|        | FIRST BIT | LAST BIT |
|--------|-----------|----------|
| NULL   | 0         | 0        |
| SMALL  | 0         | 1        |
| MIDDLE | 1         | 0        |
| LARGE  | 1         | 1        |

FIG.7

| | K | | | | | | | | Y | | | | | | | | M | | | | | | | | C | | | | | | | |
|---|---|---|---|---|---|---|---|---|---|---|---|---|---|---|---|---|---|---|---|---|---|---|---|---|---|---|---|---|---|---|---|---|
| | u1 | | u2 | | u3 | | u4 | | u1 | | u2 | | u3 | | u4 | | u1 | | u2 | | u3 | | u4 | | u1 | | u2 | | u3 | | u4 | |
| #1 | 0 | 0 | 0 | 0 | 0 | 0 | 0 | 0 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| #2 | 0 | 0 | 0 | 0 | 0 | 0 | 0 | 0 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| #3 | 1 | 0 | 1 | 0 | 1 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| #4 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| #663 | 0 | 0 | 0 | 0 | 0 | 0 | 0 | 0 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| #664 | 0 | 0 | 0 | 0 | 0 | 0 | 0 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 |

| | K | | | | | | Y | | | | | | M | | | | | | C | | | | | |
|---|---|---|---|---|---|---|---|---|---|---|---|---|---|---|---|---|---|---|---|---|---|---|---|---|
| | u1 | | u2 | | u3 | | u4 | | u1 | | u2 | | u3 | | u4 | | u1 | | u2 | | u3 | | u4 | |
| #1 | 1 | 1 | 1 | 1 | 1 | 0 | 1 | 1 | 1 | 1 | 1 | 0 | 1 | 0 | 0 | 1 | 0 | 1 | 0 | 1 | 1 | 1 | 1 | 0 |
| #2 | 1 | 1 | 1 | 0 | 0 | 1 | 1 | 1 | 1 | 1 | 1 | 1 | 1 | 1 | 0 | 1 | 0 | 1 | 1 | 0 | 1 | 1 | 1 | 1 |
| #3 | 1 | 1 | 0 | 1 | 1 | 1 | 1 | 1 | 0 | 1 | 1 | 1 | 0 | 0 | 0 | 1 | 1 | 1 | 1 | 0 | 1 | 0 | 1 | 0 |
| #4 | 1 | 1 | 1 | 1 | 0 | 1 | 1 | 1 | 1 | 1 | 0 | 0 | 0 | 1 | 1 | 1 | 0 | 0 | 0 | 1 | 1 | 1 | 1 | 1 |
| ... | | | | | | | | | | | | | | | | | | | | | | | | |
| #663 | 1 | 1 | 1 | 1 | 1 | 1 | 0 | 1 | 0 | 1 | 0 | 0 | 1 | 1 | 1 | 0 | 1 | 1 | 1 | 1 | 0 | 1 | 1 | 0 |
| #664 | 1 | 1 | 1 | 1 | 0 | 1 | 1 | 1 | 1 | 1 | 1 | 0 | 1 | 0 | 1 | 1 | 1 | 1 | 1 | 1 | 1 | 1 | 1 | 0 |

| | K | | | | | | | Y | | | | | | | M | | | | | | | C | | | | | | |
|---|---|---|---|---|---|---|---|---|---|---|---|---|---|---|---|---|---|---|---|---|---|---|---|---|---|---|---|---|
| | u1 | | u2 | | u3 | | u4 | | u1 | | u2 | | u3 | | u4 | | u1 | | u2 | | u3 | | u4 | | u1 | | u2 | | u3 | | u4 |

(Table too dense to transcribe reliably)

| | FIRST BIT | SECOND BIT | LAST BIT |
|---|---|---|---|
| NULL | 0 | 0 | 0 |
| SMALL | 0 | 0 | 1 |
| MIDDLE | 0 | 1 | 0 |
| LARGE | 0 | 1 | 1 |
| EXTRA LARGE | 1 | 0 | 0 |

FIG.14

| | K | | | | | | | | | | | Y | | | | | | | | | | | M | | | | | | |
|---|---|---|---|---|---|---|---|---|---|---|---|---|---|---|---|---|---|---|---|---|---|---|---|---|---|---|---|---|---|---|
| | u1 | | | u2 | | | u3 | | | u4 | | | u1 | | | u2 | | | u3 | | | u4 | | | u1 | | | u2 | | u3 |
| #1 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 1 | 0 | 0 | 0 | 0 | 0 | 0 |
| #2 | 0 | 0 | 0 | 0 | 0 | 1 | 0 | 0 | 0 | 0 | 0 | 0 | 0 | 0 | 0 | 1 | 0 | 1 | 0 | 1 | 0 | 0 | 0 | 0 | 0 | 0 | 0 | 0 | 0 | 0 |
| #3 | 0 | 0 | 0 | 0 | 0 | 0 | 0 | 1 | 0 | 0 | 0 | 1 | 0 | 0 | 0 | 0 | 0 | 0 | 1 | 1 | 0 | 0 | 0 | 0 | 0 | 0 | 1 | 0 | 0 | 0 |
| #4 | 0 | 0 | 0 | 0 | 0 | 1 | 0 | 0 | 0 | 0 | 0 | 0 | 0 | 0 | 0 | 0 | 1 | 1 | 0 | 0 | 0 | 0 | 0 | 0 | 0 | 0 | 1 | 0 | 0 | 0 |
| ... | | | | | | | | | | | | | | | | | | | | | | | | | | | | | | | |
| #663 | 0 | 0 | 1 | 0 | 0 | 0 | 0 | 0 | 1 | 0 | 0 | 0 | 0 | 1 | 0 | 0 | 0 | 0 | 0 | 1 | 0 | 0 | 0 | 0 | 1 | 0 | 0 | 0 | 0 | 0 |
| #664 | 0 | 0 | 0 | 0 | 0 | 0 | 0 | 0 | 1 | 0 | 0 | 0 | 0 | 0 | 0 | 0 | 0 | 1 | 0 | 0 | 0 | 0 | 0 | 0 | 0 | 0 | 1 | 0 | 0 | 0 |

FIG.15

| | K | | | | Y | | | | M | | | | C | | | | Y | | | | K | | | | Y | | | | M | | | | C | | | |
|---|---|---|---|---|---|---|---|---|---|---|---|---|---|---|---|---|---|---|---|---|---|---|---|---|---|---|---|---|---|---|---|---|---|---|---|---|
| | u1 | u2 | u3 | u4 | u1 | u2 | u3 | u4 | u1 | u2 | u3 | u4 | u1 | u2 | u3 | u4 | u1 | u2 | u3 | u4 | u1 | u2 | u3 | u4 | u1 | u2 | u3 | u4 | u1 | u2 | u3 | u4 | u1 | u2 | u3 | u4 |
| | | | | | | | FIRST BIT | | | | | | | | | | | | | | | | | | | | | | | | | | | | | |
| #1, #2 | 0 | 0 | 0 | 0 | 0 | 0 | 0 | 0 | 0 | 0 | 0 | · | 0 | · | · | · | 0 | 0 | 0 | 0 | 0 | 0 | 0 | 0 | 0 | 0 | 0 | 0 | 0 | 0 | 0 | · | 0 | · | · | · |
| #3, #4 | 0 | 0 | 0 | 0 | 0 | 1 | 0 | 0 | 0 | 0 | 0 | · | 0 | · | · | · | 0 | 0 | 0 | 0 | 0 | 0 | 1 | 0 | 0 | 0 | 0 | 0 | 0 | 0 | 0 | · | 0 | · | · | · |
| #663, #664 | 0 | 0 | 0 | 0 | 0 | 0 | 0 | 1 | 0 | 0 | 0 | · | 0 | · | · | · | 0 | 0 | 0 | 0 | 0 | 0 | 0 | 0 | 0 | 0 | 0 | 0 | 0 | 0 | 0 | · | 0 | · | · | · |
| | | | | | | | SECOND BIT | | | | | | | | | | | | | | | | | | | | | | | | | | | | | |
| #1, #2 | 0 | 0 | 0 | 0 | 0 | 1 | 0 | 0 | 0 | 0 | 0 | · | 0 | · | · | · | 0 | 0 | 0 | 0 | 0 | 0 | 0 | 0 | 0 | 0 | 0 | 0 | 0 | 1 | 0 | · | 0 | · | · | · |
| #3, #4 | 0 | 0 | 0 | 0 | 0 | 0 | 1 | 0 | 0 | 0 | 0 | · | 0 | · | · | · | 0 | 0 | 0 | 0 | 0 | 1 | 0 | 0 | 0 | 0 | 0 | 0 | 0 | 0 | 0 | · | 0 | · | · | · |
| #663, #664 | 0 | 0 | 0 | 0 | 0 | 0 | 0 | 0 | 0 | 0 | 0 | · | 0 | · | · | · | 0 | 0 | 0 | 0 | 0 | 0 | 0 | 0 | 0 | 0 | 0 | 0 | 0 | 0 | 0 | · | 0 | · | · | · |
| | | | | | | | LAST BIT | | | | | | | | | | | | | | | | | | | | | | | | | | | | | |
| #1, #2 | 0 | 0 | 0 | 1 | 0 | 0 | 1 | 0 | 1 | 1 | 0 | · | 1 | · | · | · | 0 | 0 | 1 | 0 | 0 | 1 | 0 | 0 | 0 | 1 | 1 | 0 | 0 | 0 | 0 | · | 0 | · | · | · |
| #3, #4 | 0 | 0 | 1 | 1 | 0 | 1 | 0 | 1 | 1 | 0 | 0 | · | 1 | · | · | · | 0 | 0 | 0 | 0 | 0 | 1 | 1 | 0 | 0 | 0 | 0 | 1 | 0 | 1 | 0 | · | 1 | · | · | · |
| #663, #664 | 1 | 0 | 1 | 0 | 0 | 0 | 0 | 0 | 0 | 1 | 0 | · | 0 | · | · | · | 0 | 0 | 0 | 1 | 0 | 0 | 1 | 0 | 0 | 0 | 1 | 0 | 0 | 1 | 0 | · | 0 | · | · | · |

DATA TRANSMITTING APPARATUS AND DATA TRANSMITTING PROGRAM

CROSS REFERENCE TO RELATED APPLICATION

The present application claims priority from Japanese Patent Application No. 2007-174956, which was filed on Jul. 3, 2007, the disclosure of which is herein incorporated by reference in its entirety.

BACKGROUND OF THE INVENTION

1. Field of the Invention

The present invention relates to an apparatus and program for transmitting data, for instance which is suitable for transmitting image data, which is data related to an image, to an image forming apparatus such as an inkjet recording apparatus.

2. Description of Related Art

The resolution of an image recorded by an inkjet recording apparatus or an inkjet printer is getting higher and higher, which leads to increase in an amount of image data handled by the inkjet printer. On the other hand, there is a demand for reducing a time necessary to transmit image data to an inkjet printer of high print rate, such as those having an inkjet head of line type extending across a width of a recording medium, i.e., extending perpendicular to a medium feed direction. To meet this demand, it is known to compress image data and transmit the compressed data to the inkjet printer, thereby reducing an amount of data transmission and accordingly the time necessary to transmit image data.

The image data handled by the inkjet printer is formed as a sequence of a plurality data elements of a plurality of kinds, and each data element corresponds to one of image dots. More specifically, each data element represents, by a bit sequence made up of a plurality of bits, an amount of ink to be ejected for forming (or not forming) the corresponding image dot. It does not often occur that consecutive two or more bits in a bit sequence take a same value. Thus, in image data, a frequency of occurrence of two adjacent bits having different values is high, resulting in decrease in the efficiency of compressing the image data. This in turn increases time necessary for data transmission.

There has been described the case where image data is transmitted to an inkjet printer. However, the same disadvantage can occur in other types of printers, as well as an apparatus for transmitting image data in order to form an image on a screen of a display device on the basis thereof. Further, some apparatuses for transmitting data other than image data may suffer from the disadvantage.

SUMMARY OF THE INVENTION

This invention has been developed in view of the above-described situations, and it is an object of the invention, therefore, to provide a data transmitting apparatus and a data transmitting program that can reduce the time necessary for data transmission.

There will be described by way of examples modes of inventions recognized to be claimable by the present applicant. The inventions may be hereinafter referred to as "claimable inventions", and include at least the invention as defined in the appended claims, which may be referred to as "the invention" or "the invention of the present application". However, the inventions may further include an invention of a concept subordinate or superordinate to the concept of the invention of the present application, and/or an invention of a concept different from the concept of the invention of the present application. The modes are numbered like the appended claims and depend from another mode or modes, where appropriate, for easy understanding of the claimable inventions. It is to be understood that combinations of features of the claimable inventions are not limited to those of the following modes. That is, the claimable inventions are to be construed by taking account of the description following each mode, the description of the embodiments, the related art, and others, and as long as the claimable inventions are constructed in this way, any one of the following modes may be implemented with one or more features added, or one or more of a plurality of features included in any one of the following modes are not necessarily provided all together.

(1) A data transmitting apparatus for transmitting data including a plurality of data elements, each of which is a bit sequence of a plurality of bits, and is of one of a plurality of kinds, at least one bit in the bit sequence of a first one of the kinds of data elements that most frequently occurs having the same value as a bit at a corresponding place in the bit sequence of a second one of the kinds of data elements that second most frequently occurs, the data transmitting apparatus including:

a raw-data storing portion which stores raw data as the data to be transmitted;

a data-block generating portion which generates, from the raw data stored in the raw-data storing portion, a data block, by rearranging the bit sequences of the data elements of the raw data such that bits at the same place in the respective bit sequences as each of the at least one bit are arranged in a series in the data block;

a data compressing portion which creates a compressed file by compressing the data block generated by the data-block generating portion; and a transmitting portion which transmits the compressed file created by the data compressing portion.

According to the data transmitting apparatus of the mode (1), there is generated the data block in which the bits in the respective bit sequences of the data elements at the place corresponding to each of the at least one bit having the same value between the first and second kinds of data elements are consecutively arranged in a series. Hence, a frequency of a plurality of bits of a same value being consecutively arranged in the data block is relatively high, and thus the data block can be compressed with high efficiency. Accordingly, the time necessary for data transmission is reduced. Hereinafter, each of the at least one bit having the same value in the bit sequences of both the first and second kinds of data elements may be referred to as "identical-value bit".

(2) The data transmitting apparatus according to the mode (1), wherein the bit sequence of each of the data elements is of two bits, and the value of one of a first one and a last one of the two bits in the bit sequence of the first kind of data element is the same as that of the corresponding one of the first and last bits in the bit sequence of the second kind of data element.

According to the data transmitting apparatus of the mode (2), each of the data elements represents one of four values using two bits, and either of the first bit and the last bit may be an identical-value bit. That is, the mode (2) includes a case where the value of the first bit of both the first and second kinds of data elements is "0", a case where the value of the first bit of both the first and second kinds of data elements is "1", a case where the value of the last bit of both the first and second kinds of data elements is "0", and a case where the value of the last bit of both the first and second kinds of data elements is "1".

(3) The data transmitting apparatus according to the mode (2), wherein the value of the first bit in the bit sequence of both the first and second kinds of data elements is "0", and the data block generated by the data-block generating portion includes two blocks, in one of which are arranged codes corresponding to the first bits and in the other of which are arranged codes corresponding to the last bits.

The mode (3) defines a case where the value of the first bit of the bit sequence of the first kind of data element is "00" and that of the second kind of data element is "01".

(4) The data transmitting apparatus according to the mode (2), wherein the value of the first bit in the bit sequence of both the first and second kinds of data elements is "1", and the data block generated by the data-block generating portion includes two blocks, in one of which are arranged codes corresponding to the first bits and in another of which are arranged codes corresponding to the last bits.

The mode (4) defines a case where the value of the first bit of the bit sequence of the first kind of data element is "11", and that of the second kind of data element is "10".

(5) The data transmitting apparatus according to the mode (1), wherein the bit sequence of each of the data elements is of three bits, and the value of each bit in one of (i) a pair consisting of a first one and a second one of the three bits and (ii) a pair consisting of the second one and a last one of the three bits in the bit sequence of the first kind of data element is the same as that of the corresponding bit in the bit sequence of the second kind of data element.

The mode (5) includes a case where the value of both the first and second bits of the bit sequence of both the first and second kinds of data elements is "0", a case where the value of both the first and second bits of the bit sequence of both the first and second kinds of data elements is "1", a case where the value of both the second and last bits of the bit sequence of both the first and second kinds of data elements is "0", and a case where the value of both the second and last bits of the bit sequence of both the first and second kinds of data elements is "1".

(6) The data transmitting apparatus according to the mode (5), wherein the value of the first and second bits in the bit sequence of both the first and second kinds of data elements is "0", and the data block generated by the data-block generating portion includes three blocks in a first one of which are arranged codes corresponding to the first bits, in a second one of which are arranged codes corresponding to the second bits, and in the rest of which are arranged codes corresponding to the last bits.

The mode (6) is of a case where the bit sequence of the first kind of data element takes a value "000" and that of the second kind of data element takes a value "001", in each of which the value of both the first and second bits is "0".

(7) The data transmitting apparatus according to the mode (5), wherein the value of the first and second bits in the bit sequence of both the first and second kinds of data elements is "1", and the data block generated by the data-block generating portion includes three blocks in a first one of which are arranged codes corresponding to the first bits, in a second one of which are arranged codes corresponding to the second bits, and in the rest of which are arranged codes corresponding to the last bits.

The mode (7) is of a case where the bit sequence of the first kind of data element takes a value "111" and that of the second kind of data element takes a value "110", in each of which the value of both the first and second bits is "1".

(8) The data transmitting apparatus according to any one of the modes (1)-(7), wherein the raw data includes at least image data which represents an image.

In image data, it is often the case that among all of a plurality of kinds of data elements, one that takes the smallest value and another that takes the second smallest value, or one that takes the largest value and another that takes the second largest value, most frequently and second most frequently occur, respectively. Therefore, it is often effective to apply the invention to transmissions of image data.

(9) The data transmitting apparatus according to the mode (8), wherein the transmitting portion transmits the compressed file to an image forming apparatus which forms an image on the basis of the image data.

(10) The data transmitting apparatus according to the mode (9), wherein the image forming apparatus is an image recording apparatus which records an image on a recording medium.

It is often the case that transmission of image data to an image recording apparatus is implemented while an image is being recorded on a recording medium. Recently, the speed of recording or the print rate has become higher and higher, and it is required to accordingly increase the rate at which image data is supplied. The invention is especially effective when applied to data transmission to an image recording apparatus.

(11) The data transmitting apparatus according to the mode (10), wherein the image recording apparatus is of line type which includes a feeding device feeding the recording medium in a feeding direction and at least one recording head of line type extending perpendicular to the medium feed direction

(12) The data transmitting apparatus according to the mode (11), wherein the image recording apparatus comprises an inkjet recording device including at least one line-type inkjet head having a plurality of nozzles from each of which a droplet of ink is ejected onto the recording medium so as to record the image thereon by forming a plurality of image dots constituting the image, and wherein each of the data elements includes a dot data element, which is a bit sequence of a plurality of bits and is one of a plurality of sorts respectively corresponding to the kinds of data elements and to different amounts of ink to be ejected to form the image dots.

Since the line-type inkjet head have a multiple of nozzles, data amount to be transmitted for one cycle of recording is large. It is especially effective to apply the present invention to the data transmitting apparatus for it so as to reduce a time necessary to transmit the recording data.

(13) The data transmitting apparatus according to the mode (12), wherein the bit sequence of each of the dot data elements is of two bits, and the value of one of a first one and a last one of the two bits in the bit sequence of a first one of the sorts of dot data elements which corresponds to the first kind of data element is the same as that of the corresponding one of the first and last bits in the bit sequence of a second one of the sorts of dot data elements which corresponds to the second kind of data element.

(14) The data transmitting apparatus according to the mode (13), wherein the bit having the same value between the first and second sorts of dot data elements is one of the first bit whose value is "0" and the last bit whose value is "1", and the data-block generating portion generates the data block by splitting each of the dot data elements into the first bit and the last bit, and then arranging codes corresponding to the first bits of all the dot data elements and codes corresponding to the last bits of all the dot data elements in respective series each corresponding to an order of disposition of the nozzles in the at least one inkjet head.

(15) The data transmitting apparatus according to any one of the modes (12)-(14), wherein the at least one inkjet head includes a plurality of inkjet heads corresponding to respective colors, and each of the inkjet heads has at least one group of nozzles, and wherein the arranging the codes corresponding to the first bits and the codes corresponding to the last bits in respective series is implemented such that in each of the series of codes, codes corresponding to nozzles at a same place in the order of disposition of the nozzles in the respective groups of nozzles in the respective inkjet heads are consecutively arranged, and the thus obtained consecutive arrangements are sequenced in the order of disposition of the nozzles.

(16) The data transmitting apparatus according to the mode (12), wherein the bit sequence of each of the dot data elements is of three bits, and the value of each bit in one of (i) a pair consisting of a first one and a second one of the three bits and (ii) a pair consisting of the second one and a last one of the three bits in the bit sequence of the first sort of dot data element corresponding to the first kind of data element is the same as that of the corresponding bit in the bit sequence of the second sort of dot data element corresponding to the second kind of data element.

(17) The data transmitting apparatus according to the mode (16), wherein the bits each having the same value between the first and second sorts of dot data elements are either one pair of the first and second bits both of whose values are "0" and the second and last bits both of whose values are "1", and the data-block generating portion generates the data block by splitting each of the dot data elements into the first bit, the second bit, and the last bit, and then arranging codes corresponding to the first bits of all the dot data elements, codes corresponding to the second bits of all the dot data elements, and codes corresponding to the last bits of all the dot data elements, in respective series each corresponding to an order of disposition of the nozzles in the at least one inkjet head.

(18) The data transmitting apparatus according to the mode (17), wherein the at least one inkjet head includes a plurality of sets of inkjet heads, which correspond to respective colors, and each of which includes at least one inkjet head each of which has at least one group of nozzles, and wherein the arranging the codes corresponding to the first bits, the codes corresponding to the second bits, and the codes corresponding to the last bits, in respective series, is implemented such that in each of the series of codes, codes corresponding to nozzles at a same place in the order of disposition of the nozzles in the respective groups of nozzles in the respective inkjet heads are consecutively arranged in the order of disposition of the nozzles.

(19) A data transmitting program for having a computer function to transmit data including a plurality of data elements, each of which is a bit sequence of a plurality of bits, and is of one of a plurality of kinds, at least one bit in the bit sequence of a first one of the kinds of data elements that most frequently occurs having the same value as a bit at a corresponding place in the bit sequence of a second one of the kinds of data elements that second most frequently occurs, the program including:

a data-block generating process for generating a data block, from raw data to be transmitted which is stored in a raw-data storing portion, by rearranging the bit sequences of the data elements of the raw data such that the bits at the place of each of the at least one bit in all the bit sequences are arranged in a series in the data block;

a data compressing process for creating a compressed file by compressing the data block generated in the data-block generating process; and a transmitting process for transmitting the compressed file created in the data compressing process.

The features of the modes (2)-(18) can be employed in the data transmitting program of the mode (19).

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which:

FIG. 6 illustrates a structure of a dot data element, which can be one of four sorts;

FIG. 7 illustrates a structure of an example of image data that is stored in an image storing portion shown in FIG. 1 and is made up of a plurality of dot data elements having the structure illustrated in FIG. 6;

FIG. 8 illustrates a structure of a dot block which a data-block generating portion shown in FIG. 1 generates by processing the image data of FIG. 7;

FIG. 9 illustrates a structure of another example of image data in which a code corresponding to a first bit of a first one of the sorts of dot data elements that most frequently occurs and a code corresponding to a first bit of a second one of the sorts of dot data elements that second most frequently occurs have a same value which is "1";

FIG. 10 illustrates a structure of a dot block which a data-block generating portion shown in FIG. 1 generates by processing the image data of FIG. 9;

FIG. 11 illustrates a structure of still another example of image data in which a code corresponding to a last bit of the first sort of dot data element and a code corresponding to a last bit of the second sort of dot data element have a same value which is "0";

FIG. 12 illustrates a structure of a dot block which a data-block generating portion shown in FIG. 1 generates by processing the image data of FIG. 11;

FIG. 13 illustrates a structure of a dot data element of another kind than that of the dot data element of FIG. 6;

FIG. 14 illustrates a structure of an example of image data that is stored in the image storing portion and is made up of a plurality of dot data elements of the structure of FIG. 13; and FIG. 15 illustrates a structure of a dot block which the data-block generating portion generates by processing the image data of FIG. 14.

DETAILED DESCRIPTION OF PREFERRED EMBODIMENTS

Hereinafter, there will be described a control apparatus as a data transmitting apparatus according to one presently preferred embodiment of the invention, by referring to the accompanying drawings.

Figure 1:
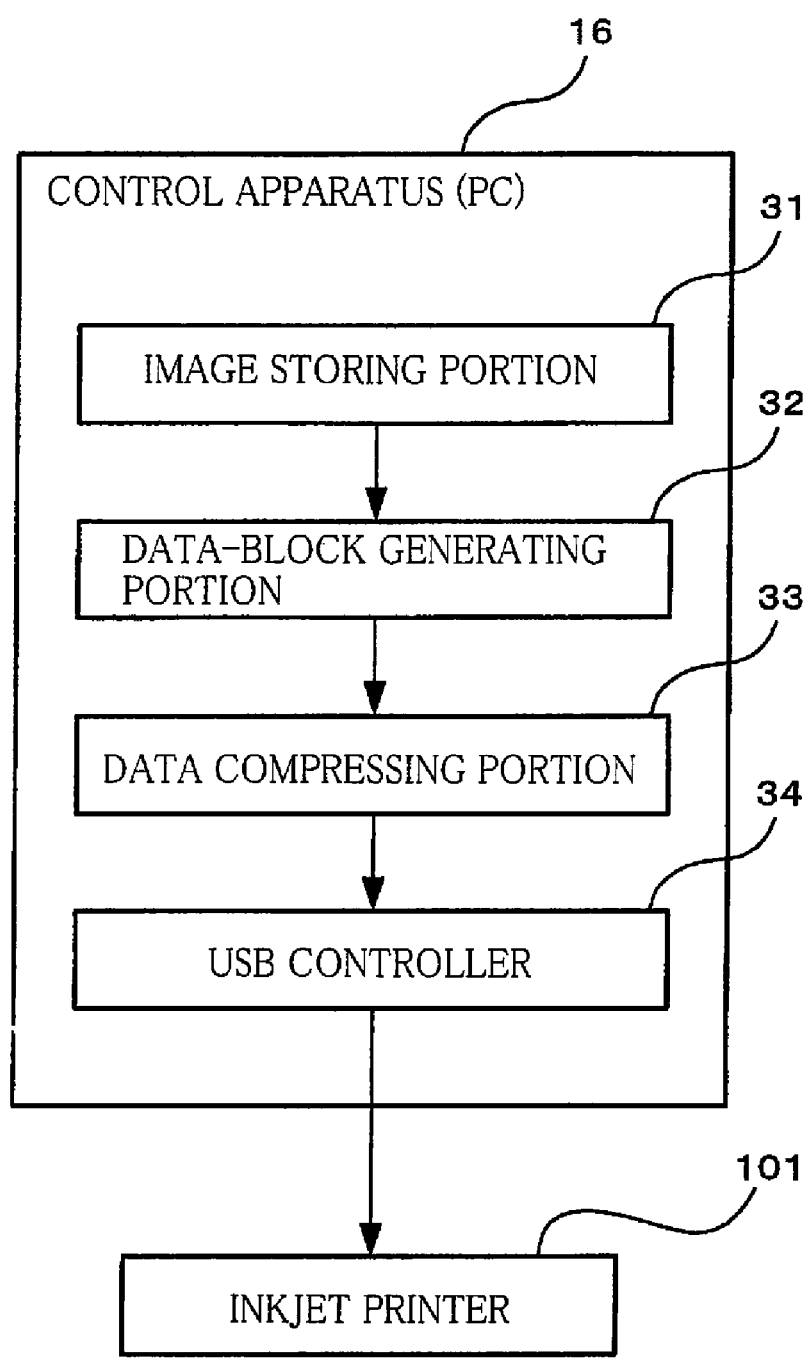
FIG. 1 is a functional block diagram of a control apparatus according to one embodiment of the invention.

The control apparatus, which is denoted by reference numeral 16 in FIG. 1, takes the form of a PC (Personal Computer) that executes a control program. The PC includes a CPU (Central Processing Unit), a ROM (Read Only Memory), a RAM (Random Access Memory), and a HDD (Hard Disk Drive). The CPU executes the control program to implement the functional portions of the control apparatus 16 as described later. The control apparatus 16 operates to control an operation of an inkjet printer 101, and is connected by USB with the inkjet printer 101 such that communication therebetween is possible. The control apparatus 16 compresses image data block (as a data block) of an image to be recorded by the inkjet printer 101 on a recording sheet P (shown in FIG. 2) as a recording medium fed into the inkjet printer 101 from the outside, and transmits the compressed image data block, or a compressed image file, to the inkjet printer 101. In addition to the above-described function as a data transmitting apparatus, the control apparatus 16 also has a function to control the inkjet printer 101 to record the image of the compressed image file in response to an instruction from a user. Hereinafter, the function of the control apparatus 16 as a data transmitting apparatus will be mainly illustrated.

Figure 2:
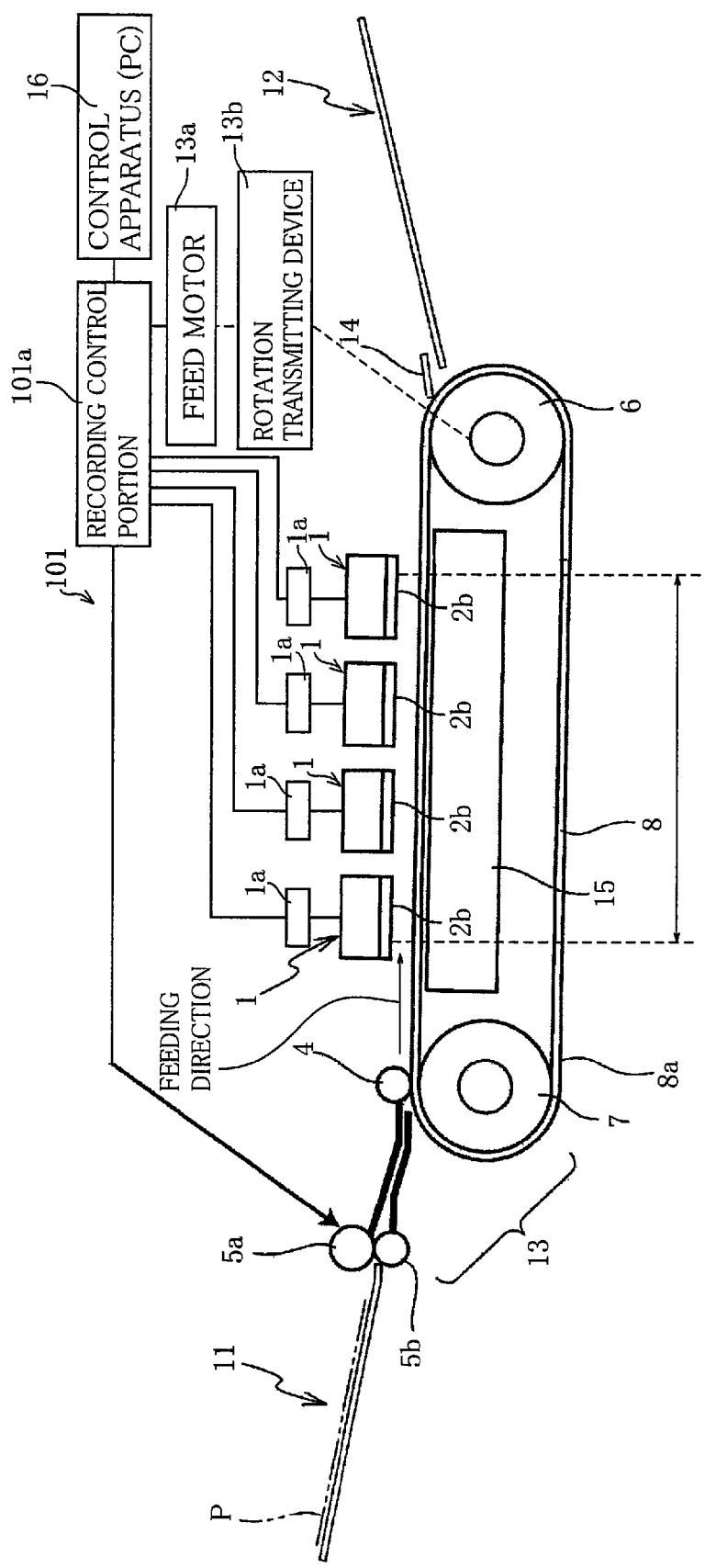
FIG. 2 is a schematic side view of an inkjet printer shown in FIG. 1.

There will be described the inkjet printer 101 as an object of control by the control apparatus 16, with reference to FIG. 2 which is a schematic side view of the inkjet printer 101. As shown in FIG. 2, the inkjet printer 101 is a color inkjet printer having four inkjet heads 1. At a left side and a right side of the inkjet printer 101, a sheet supply tray 11 and a sheet catch tray 12 are disposed, respectively.

Inside the inkjet printer 101 is formed a sheet feed path along which the recording sheet P is fed from the sheet supply tray 11 to the sheet catch tray 12. At a position immediately downstream of the sheet supply tray 11 with respect to a direction of feeding of recording sheet (hereinafter referred to as "feeding direction"), a pair of feeder rollers 5a, 5b are disposed to nip therebetween and feed a recording sheet. At a middle portion of the sheet feed path, a belt feeding mechanism or a feeding device 13 is disposed. The belt feeding mechanism 13 includes two belt rollers 6, 7, an endless feeder belt 8 wound and entrained around the belt rollers 6, 7, and a platen 15 disposed inside a circle of the feeder belt 8 and at a position opposed to the inkjet heads 1. The platen 15 functions to support the feeder belt 8 at an area opposed to the inkjet heads 1 so as to prevent sagging of the feeder belt 8. Adjacent to the belt roller 7 is disposed a nip roller 4, which presses the recording sheet P as fed out from the sheet supply tray 11 by the feeder rollers 5a, 5b, against an outer circumferential surface 8a of the feeder belt 8.

The feeder belt 8 is circulated by the belt roller 6 being rotated by a feed motor 13a via a rotation transmitting device 13b. By the circulation of the feeder belt 8, the recording sheet P is fed toward the sheet catch tray 12 such that the recording sheet P is pressed onto the outer circumferential surface 8a of the feeder belt 8 by the nip roller 4 and thus adhesively held thereon. The inkjet printer 101 includes a recording control portion 101a which controls the inkjet heads 1, the feeding device 13, and others, on the basis of control information supplied from the control apparatus 16. More specifically, the recording control portion 101a controls the feed motor 13a to control the feeding device 13, and controls driver ICs 1a described later to control the inkjet heads 1.

At a position immediately downstream of the feeder belt 8 with respect to the feeding direction, a sheet separating mechanism 14 is disposed. The sheet separating mechanism 14 functions to separate from the outer circumferential surface 8a of the feeder belt 8 the recording sheet P adhesively held thereon, and feed the recording sheet onto the sheet catch tray 12 at the right side as seen in FIG. 2.

The inkjet heads 1 respectively correspond to four inks of different colors, namely, magenta, yellow, cyan and black, and are disposed along the feeding direction. That is, the inkjet printer 101 is a line-type printer. Each of the four inkjet heads 1 has a main body 2 at a lower end thereof. The main body 2 of the inkjet head 1 has the shape of a rectangular parallelepiped long in a direction perpendicular to the feeding direction of the recording sheet P. An under surface of the main body 2 of the inkjet head 1 includes an ink ejection surface 2a opposed to the outer circumferential surface 8a of the feeder belt 8. When the recording sheet P being fed by the feeder belt 8 passes by immediately under an array of the main bodies 2 of the inkjet heads 1, the inks of respective colors are ejected from the ink ejection surface 2a onto an upper surface, or a recording surface, of the recording sheet P, thereby forming a desired color image on the recording surface of the recording sheet P.

Figure 3:
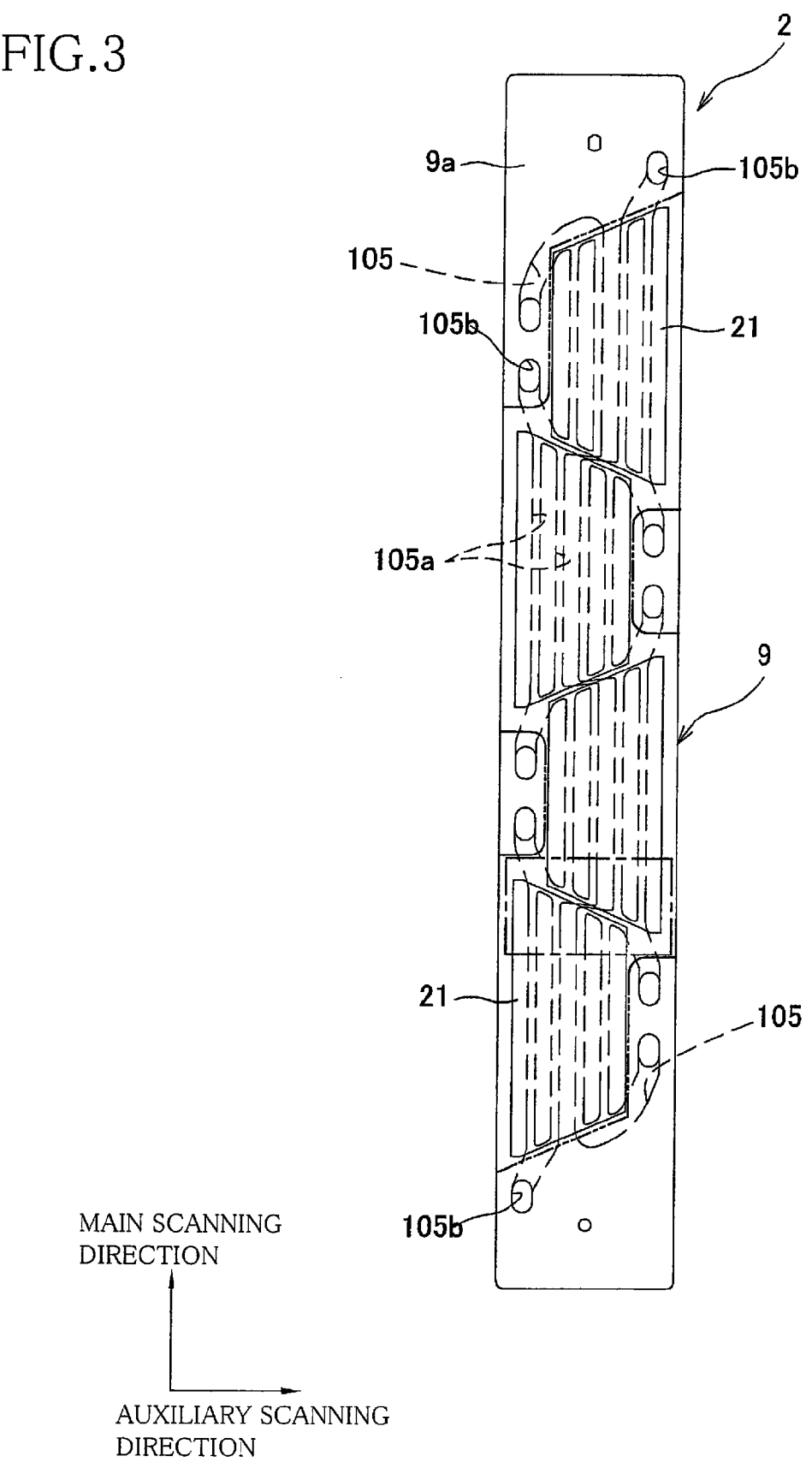
FIG. 3 is a plan view of a main body of an inkjet head shown in FIG. 2.
Figure 4:
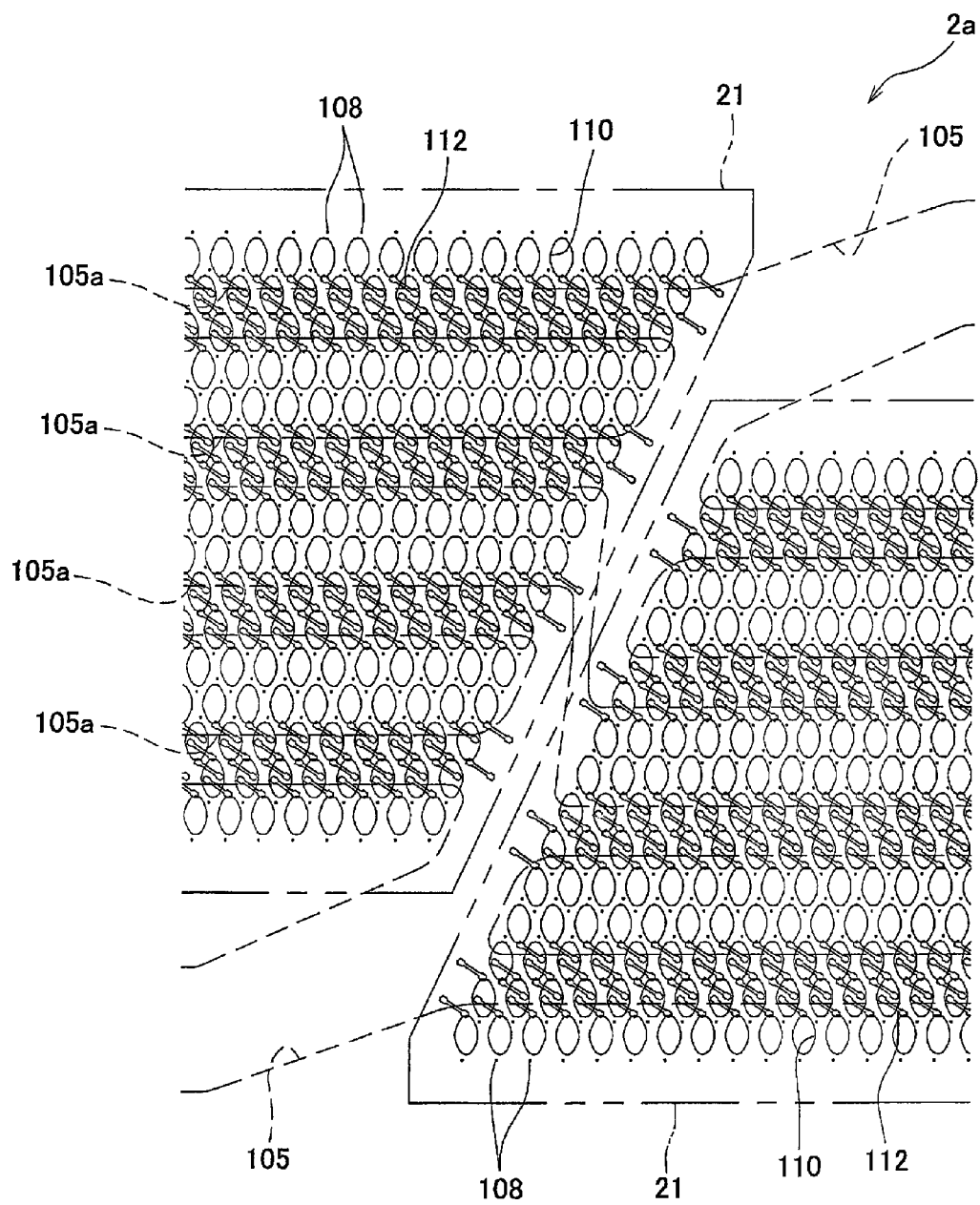
FIG. 4 shows in enlargement a part of FIG. 3 enclosed by dashed line.

There will be described the inkjet head 1 by referring to FIGS. 3 and 4, in which FIG. 3 is a plan view of the inkjet head 1 and FIG. 4 shows in enlargement a part of FIG. 3 enclosed by dashed line. In FIG. 4, pressure chambers 110, apertures 112, and the nozzles 108 that are disposed below actuator units 21 and supposed to be indicated by broken line are actually indicated by solid line, for the sake of convenience. The inkjet head 1 has the main body 2 and a reservoir unit (not shown). The reservoir unit is disposed on an upper surface of the main body 2 of the inkjet head 1, which is a surface on the side opposite to the feeder belt 8, and stores an ink to be supplied to the main body 2 of the inkjet head 1.

As shown in FIGS. 3 and 4, the main body 2 of the inkjet head 1 includes four actuator units 21 and a fluid passage unit 9. The four actuator units 21 are fixed on an upper surface 9a of the fluid passage unit 9, which is a surface on the side opposite to the feeder belt 8. The fluid passage unit 9 is a planar member having the shape of a rectangular parallelepiped. In the upper surface 9a of the fluid passage unit 9 are open ink ports 105b ten in total, through which the ink is taken into the fluid passage unit 9 from the reservoir unit. Inside the fluid passage unit 9 are formed manifold passages 105 in communication with the ink ports 105b, sub manifold passages 105a diverging from the manifold passages 105, and a large number of individual ink passages 132 each extending from an end of one of the sub manifold passages 105a to one of the nozzles 108 via a corresponding one of the pressure chambers 110. The ink ejection surface 2a in which a large number of nozzles 108 are arranged in matrix is formed on an under surface of the fluid passage unit 9, which is a surface on the side of the feeder belt 8.

There will be described how the ink flows in the fluid passage unit 9. The ink supplied from the reservoir unit into the fluid passage unit 9 through the ink ports 105b flows along the manifold passages 105 and then along the sub manifold passages 105a diverging from the manifold passages 105. Out of the sub manifold passages 105a, the ink flows into individual ink passages 132 and then flows along the individual ink passages 132 to reach the nozzles 108 via the apertures 112 functioning as a flow restrictor and the pressure chambers 110.

There will be described the actuator unit 21. As shown in FIG. 3, the four actuator units 21 each having a trapezoidal shape in plan view are arranged in a staggered manner to circumvent the ink ports 105b. The actuator units 21 are disposed such that the two opposing sides parallel to each other in the trapezoidal shape of the actuator unit 21 extend along a longitudinal direction of the fluid passage unit 9. Two adjacent oblique sides of each two adjacent actuator units 21a, that is, an oblique side of an actuator unit 21 and an oblique side of an adjacent actuator unit 21 which oblique sides extend side by side, overlap each other with respect to a width direction of the fluid passage unit 9, which corresponds to an auxiliary scanning direction in the inkjet printer 101.

The actuator unit 21 includes a plurality of actuators corresponding to the pressure chambers 110, and has a function to selectively give ejection energy to the ink in the pressure chambers 110. More specifically, the actuator unit 21 is formed of three piezoelectric sheets made of lead zirconate titanate (PZT) ceramics having ferroelectricity. each of the piezoelectric sheets has a size to extend across a plurality of pressure chambers 110. On a topmost one of the piezoelectric sheets and at positions corresponding to the pressure chambers 110, individual electrodes are formed. Between the topmost and the second topmost piezoelectric sheets is interposed a grounding electrode formed across an entire surface of the sheets.

In the grounding electrode, the ground potential is equally given at the positions corresponding to all the pressure chambers 110. On the other hand, to the individual electrodes a drive signal is selectively inputted from the driver IC 1a. The recording control portion 101a decodes image data supplied from the control apparatus 16 into data corresponding to pixels of an image, and supplies the data to the driver IC 1a, which then generates a drive signal corresponding to the decoded data and supplies the drive signal to the actuator units 21. Thus, in the actuator unit 21, portions sandwiched between the individual electrodes and the pressure chambers 110 function as individual actuator elements. That is, there are formed actuator elements of the same number as the pressure chambers 110.

There will be described how the actuator unit 21 is driven. The actuator unit 21 is of unimorph type in which the upper one of the piezoelectric sheets, i.e., the piezoelectric sheet remote from the pressure chambers 110, is an active layer, and the lower two of the piezoelectric sheets, i.e., the two piezoelectric sheets on the side of the pressure chambers 110, are inactive layers. When a voltage pulse is outputted to an individual electrode, the portion of the piezoelectric sheet corresponding to the individual electrode deforms to pressurize the ink inside the pressure chamber 110, that is, ejection energy is given to the ink in the pressure chamber 110, whereby an ink droplet is ejected from the nozzle 108.

Figure 5:
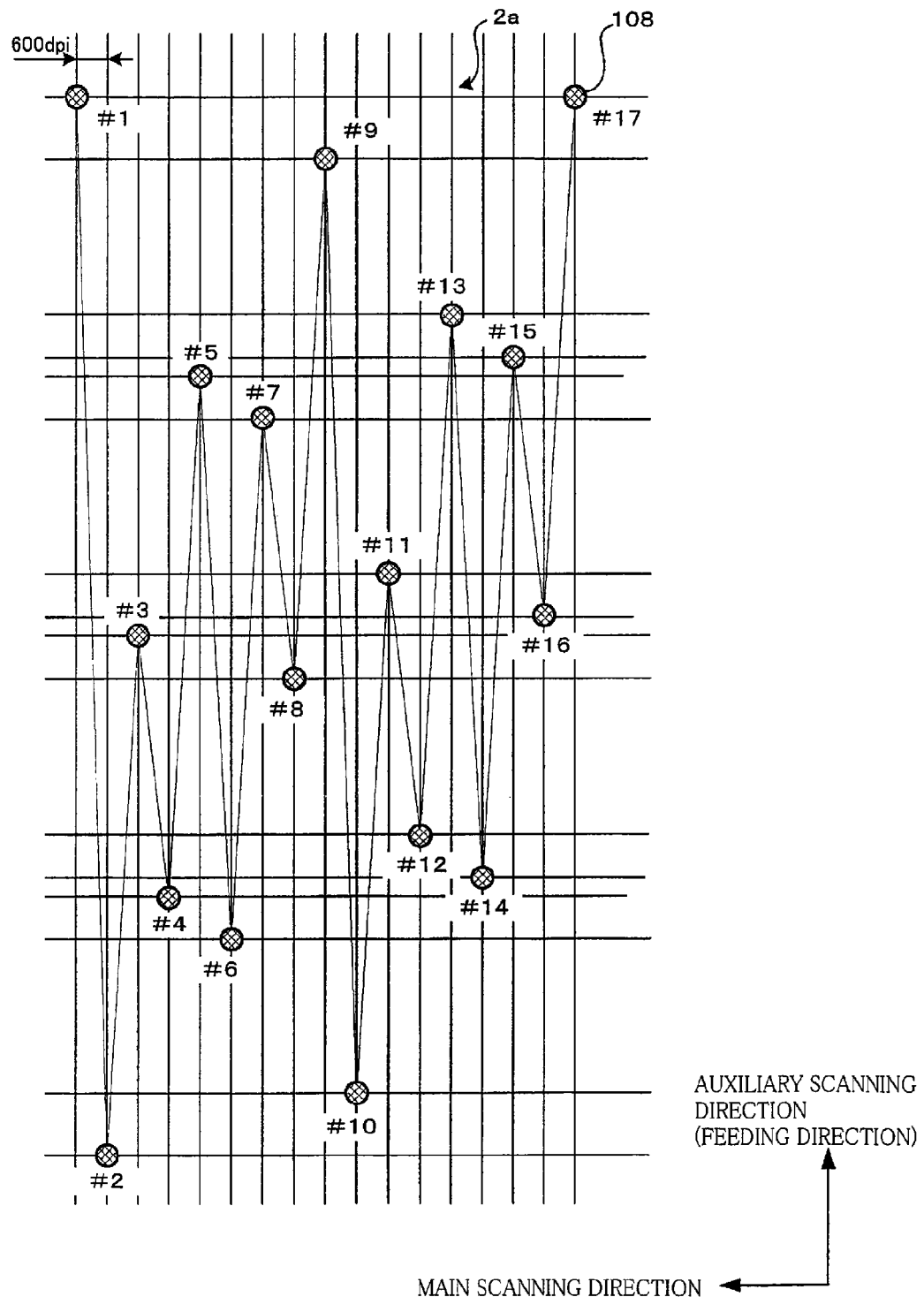
FIG. 5 shows in enlargement a part of an ink ejection surface shown in FIG. 4.

Referring to FIG. 5, there will be described disposition of the nozzles 108 in the ink ejection surface 2a. FIG. 5 is an enlarged view of a part of the ink ejection surface 2a and shows a positional relationship among the nozzles 108. In FIG. 5, a left-right direction corresponds to a main scanning direction which is perpendicular to the feeding direction, and a vertical direction corresponds to an auxiliary scanning direction that is along the feeding direction. In addition, the scale of enlargement differs between the main scanning direction and the auxiliary scanning direction in FIG. 5, for convenience of illustration.

As shown in FIG. 5, on the ink ejection surface 2a, the nozzles 108 are arranged in the main scanning direction and the auxiliary scanning direction to form a matrix. More specifically, the nozzles 108 are arranged on 16 imaginary lines extending parallel to one another along the main scanning direction. 16 nozzles 108 disposed one on each of the imaginary lines form a unit of image forming at a resolution of 600 dpi with respect to the main scanning direction, which is the highest resolution in the same direction. The nozzles 108 are arranged such that a plurality of the units of nozzles are sequentially arranged in the main scanning direction. As described above, four actuator units 21 are arranged in each of the inkjet heads 1, and 664 nozzles 108 numbered 1-664 are arranged with respect to the main scanning direction, on the under surface of each of the actuator units 21. Each 664 nozzles 108 corresponding to one of the four actuator units 21 form a nozzle group u1, u2, u3, u4. Thus, in the ink ejection surface 2a of each of the inkjet heads 1, the nozzles 108 of the four groups u1-u4 that total 2656 (664×4) are open.

Two nozzles 108 adjacent to each nozzle 108 with respect to the main scanning direction are disposed on the upper side or the lower side with respect to the auxiliary scanning direction (that is, on the upstream side or the downstream side with respect to the feeding direction) of the nozzle 108. In other words, the nozzles 108 are arranged in a staggered manner along the main scanning direction. According to the above-described way of nozzle arrangement, the individual ink passages including the nozzles 108 can be arranged in the fluid passage unit 9 in high density.

Referring back to FIG. 1, there will be described the control apparatus 16. The control apparatus 16 includes an image storing portion 31, a data-block generating portion 32, a data compressing portion 33, and a USB controller 34 as a transmitting portion. The image storing portion 31 stores image data of an image to be recorded on a recording sheet P by the inkjet printer 101. The image data is supplied from the outside of the control apparatus 16, for instance via a memory card (not shown). The data-block generating portion 32 generates, based on the image data stored in the image storing portion 31, a data block for transmission. The data compressing portion 33 compresses the data block generated by the data-block generating portion 32 by run-length encoding method. The USB controller 34 transmits the compressed file generated by the data compressing portion 33, to the inkjet printer 101.

Figure 8:
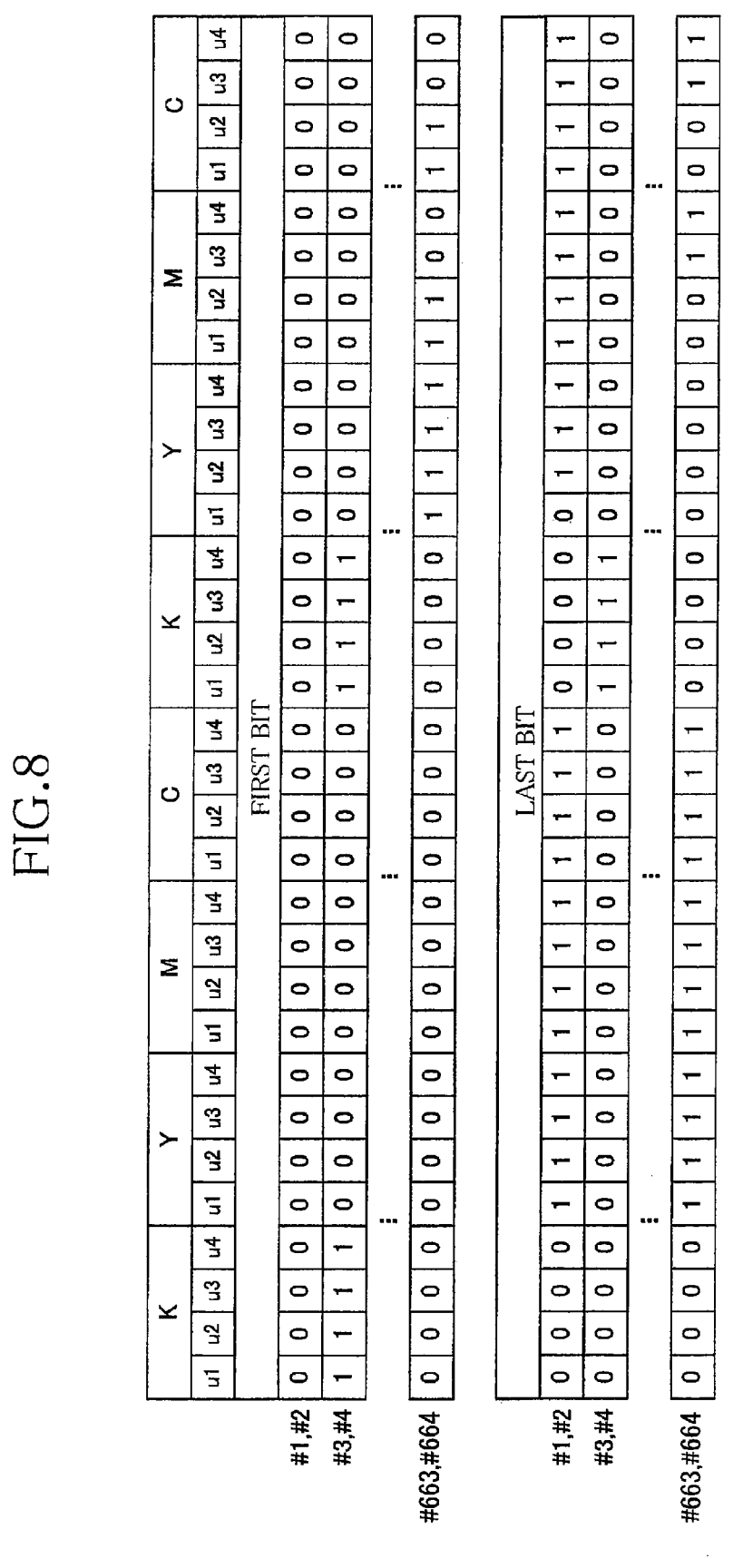

There will be described an operation of the data-block generating portion 32 and the data compressing portion 33, by referring to FIGS. 6-8, in which FIG. 6 illustrates a structure of a dot data element a plurality of which constitute the image data, FIG. 7 illustrates a structure of an example of the image data stored in the image storing portion 31 and made up of a plurality of the dot data elements, and FIG. 8 illustrates a structure of the data block which the data-block generating portion 32 generates by processing the image data of FIG. 7. It is noted that FIGS. 7 and 8 show the image data and data block corresponding to one cycle of recording in the inkjet printer 101. As shown in FIG. 7, the image data is made up of dot data elements that are arranged to correspond to the nozzles 108 of #1-664 in each of the nozzle groups u1-u4 of each of the inkjet heads 1 of black (K), yellow (Y), magenta (M), and cyan (C).

As shown in FIG. 6, the dot data element is a code representative of a number of ink droplets ejected from a nozzle 108 to form a dot of the image. That is, the dot data element represents, by a bit sequence of two bits, an amount of ink to be ejected. In the present embodiment, there are predetermined four sorts of dot data elements, namely, dot data elements of "00", "01", "10" and "11" and "00", which respectively instruct to not eject any ink droplet to not form a dot (NULL), to eject one ink droplet to form a small dot (SMALL), to eject two ink droplets to form a dot of middle size (MIDDLE), and to eject three ink droplets to form a large dot (LARGE).

When a color image is recorded by forming the image dots of the four sorts respectively corresponding to four amounts of ink ejected or four sizes of the image dots formed, "00" is a first one of the four sorts of dot data elements that corresponds to the image dot of a size most frequently occurs in the image data, and "01" is a second one of the four sorts of dot data elements that corresponds to the image dot of a size second most frequently occurs in the image data. In the bit sequences of the dot data elements of codes "00" and "01", a bit at a same place (namely, at a first bit) takes the same value or code which is "0". Hereinafter, the first bit where the value is identical between the first and second sorts of dot data elements will be referred to as "identical-value bit".

As shown in FIG. 8, the data-block generating portion 32 generates, from the image data stored in the image storing portion 31, a data block by rearranging the bit sequences (or the codes) of the dot data elements of the image data such that bits at the same place in the respective bit sequences as the "identical-value bit", namely, the first bits, of all the bit sequences, are arranged in a series or a block, as well as the last bits of all the bit sequences are arranged in a series or a block likewise. A specific case shown in FIG. 8 will be described. The data-block generating portion 32 first splits each of all the dot data elements of the image data shown in FIG. 7 into discrete bits. Then, the first bits of all the dot data elements are arranged in a series in the order of the numbers 1-664 assigned to the corresponding nozzles 108. Namely, a bit string in which are arranged the first bits of the dot data elements corresponding to the nozzles #1 of the nozzle groups u1-u4 is formed with respect to the inkjet head 1 of each color K, Y, M and C. Then, the thus obtained four bit strings respectively corresponding to the inkjet heads of four colors KYMC are successively arranged in the order of K→Y→M→C. Such a consecutive arrangement of the bits of the dot data elements corresponding to the nozzles 108 of a same number in all the four inkjet heads is made also with respect to each of the following numbers 2-664. The thus obtained consecutive bit arrangements corresponding to the respective numbers 1-664 of the nozzles are sequenced in the order of the numbers 1-664. The last bits of all the dot data elements are also arranged in a series in the same way as the first bits.

When the data-block generating portion 32 completes to generate the data block, the data compressing portion 33 compresses the data block by run-length encoding method, which is one of known data compression methods according to which data is compressed by representing a sequence of bits representative of a same code as a combination of the code itself and the number of the bits. In the specific case of FIG. 8, the code of one of the four sorts of dot data elements (which represent different sizes of the image dots formed using respective amounts of ink or respective numbers of ink droplets) that most frequently occurs or appears in the image data is "00", and the code of another sort of dot data element that second most frequently occurs in the image data is "01". Hence, the first bit of the sort of dot data element most frequently occurring (or the first bit of the sort whose occurrence rate is the highest), and the second bit of the sort second most frequently occurring (or the first bit of the sort whose occurrence rate is the second highest) have a same value (or is representative of a same code), namely, "0". In other words, the first bit in the most frequently occurring sort of dot data element and the second most frequently occurring sort of dot data element is an "identical-value bit" therebetween. In a part of the data block, i.e., in a series or a block in the data block where only the first bits of all the dot data elements are sequentially arranged, a frequency of a plurality of bits of code "0" consecutively occurring is relatively high.

In the above-described embodiment, the data-block generating portion 32 generates, from the image data, the data block by rearranging the bit sequences (or the codes) of the dot data elements of the image data such that bits at the same place in the respective bit sequences as the "identical-value bit", namely, the first bits, of all the bit sequences, are arranged in a series, as well as the last bits of all the bit sequences are arranged in a series likewise. In the thus generated data block, the frequency of a plurality of bits of code or value "0" consecutively occurring is relatively high. Therefore, the data compressing portion 33 can compress the data block by run-length encoding method with relatively high efficiency. Thus, the time necessary to send the data block to the inkjet printer 101 is reduced.

Figure 10:
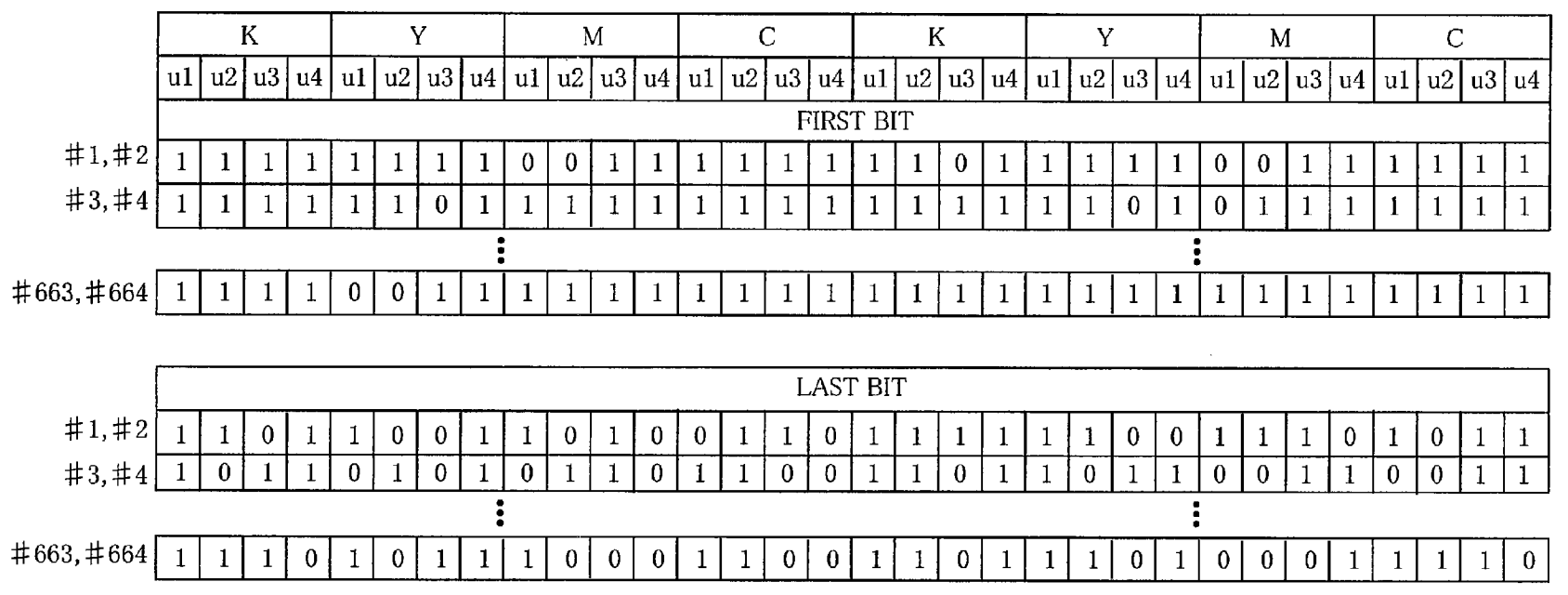

The invention is applicable to a modified case where the image data is such that codes of the most and second most frequently occurring sorts of dot data elements are "11" and "10", that is, the value or code of the first bit in both of the two sorts of dot data elements is identically "1", that is, the first bit is an identical-value bit between the two sorts of dot data elements. This modified case is illustrated in FIGS. 9 and 10. According to the modified case, a frequency of a plurality of bits of code "1" consecutively occurring is relatively high, thereby enhancing the efficiency of compressing the data block.

Figure 12:
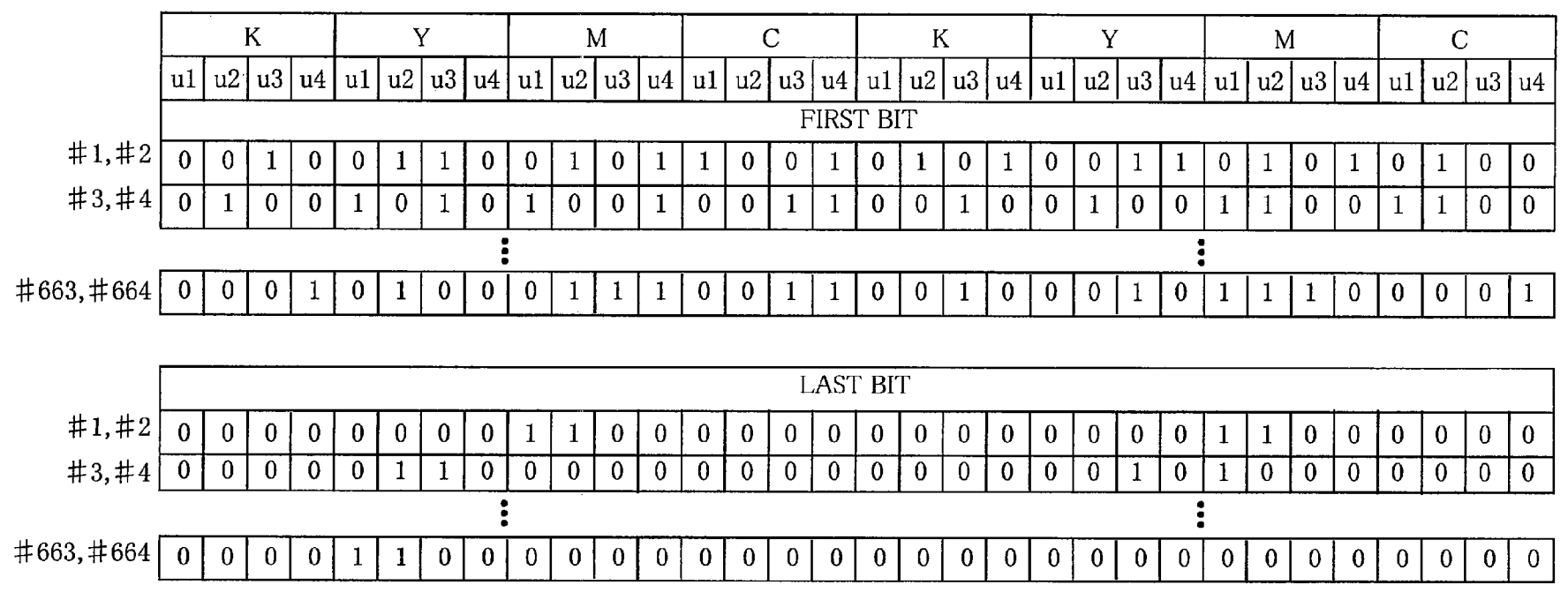

The invention is equally applicable to another modified case where the image data is such that the second bit of the most and second most frequently occurring sorts of dot data elements is an identical-value bit therebetween. For instance, the case may be when codes of the most and second most frequently occurring sorts of dot data elements are "00" and "10". An example of this case is illustrated in FIGS. 11 and 12. According to this case, a frequency of a plurality of bits of code "0" consecutively occurring is relatively high, thereby enhancing the efficiency of compressing the data block.

Although there have been described one embodiment of the invention and its modifications, it is to be understood that the invention is not limited to the details thereof, but may be otherwise embodied with various other modifications and improvements that may occur to those skilled in the art, without departing from the scope and spirit of the invention defined in the appended claims.

For instance, in the above-described embodiment, each dot data element is made up of two bits, and the data-block generating portion 32 generates the data block in which the bits at the same place in the data elements with the identical-value bit, that is, the first bits, are arranged in a series. However, the embodiment may be modified such that each of the dot data elements is made up of three or more bits. Where the dot data element is of three or more bits, a plurality of identical-value bits are included in the most frequently and second most frequently occurring sorts of dot data elements, and the data-block generating portion generates a data block in which the bits at the same place in the data elements with each of the identical-value bits are arranged in a series.

An example of such a modification is illustrated in FIGS. 13-15, in which FIG. 13 shows a structure of a 3-bit dot data element, FIG. 14 shows image data corresponding to that of the embodiment shown in FIG. 7, and FIG. 15 shows a data block that the data-block generating portion generates by processing the image data of FIG. 14. In this modification, codes of a most frequently occurring one and a second most frequently occurring one of five sorts of dot data elements, which respectively represent different amounts of ink to be ejected (or different numbers of ink droplets to be ejected) from the nozzle, are respectively "000" and "001", in both of which the codes of the first and second bits are "0". That is, the first and second bits are identical-value bits. As shown in FIG. 15, in each of two blocks or series in which the first bits and the second bits are respectively sequentially arranged, a frequency of a plurality of bits of code "0" consecutively occurring is relatively high.

In the case where the dot data elements are of three bits, the number of sorts of dot data elements that correspond to various sizes of image dot can be increased up to eight. However, in the present modification shown in FIGS. 13-15, it is arranged such that there are only five sorts of dot data elements.

In the above-described embodiment and its modification, the identical-value bit(s) based on which the data block is generated is predetermined. However, the identical-value bit or bits may be determined for each image data.

In the above-described embodiment, run-length encoding method is employed when the data compressing portion 33 compresses the data block. However, other methods than run-length method such as entropy encoding method or universal encoding method may be employed. When the data compression is implemented using these methods, the efficiency of data compression is relatively high in the case of a data block in which a frequency of occurrence of bits of a same code is high.

In the above-described embodiment, the control apparatus 16 sends the compressed file to the inkjet printer via the USB controller 34. However, the compressed file may be sent to the inkjet printer 101 by other communication means than using a USB connection.

In the above-described embodiment, the control apparatus 16 is realized by executing the control program on the PC. However, the control apparatus 16 may be realized by executing the control program on a computer which is not a PC.

What is claimed is:

1. A data transmitting apparatus for transmitting data including a plurality of data elements, each of which is a bit sequence of a plurality of bits, and is of one of a plurality of kinds, at least one bit in the bit sequence of a first one of the kinds of data elements that most frequently occurs having the same value as a bit at a corresponding place in the bit sequence of a second one of the kinds of data elements that second most frequently occurs, the data transmitting apparatus comprising:
   a raw-data storing portion which stores raw data as the data to be transmitted;
   a data-block generating portion which generates, from the raw data stored in the raw-data storing portion, a data block, by rearranging the bit sequences of the data elements of the raw data such that bits at the same place in the respective bit sequences as each of the at least one bit are arranged in a series in the data block;
   a data compressing portion which creates a compressed file by compressing the data block generated by the data-block generating portion; and
   a transmitting portion which transmits the compressed file created by the data compressing portion.

2. The data transmitting apparatus according to claim 1, wherein the bit sequence of each of the data elements is of two bits, and the value of one of a first one and a last one of the two bits in the bit sequence of the first kind of data element is the same as that of the corresponding one of the first and last bits in the bit sequence of the second kind of data element.

3. The data transmitting apparatus according to claim 2, wherein the value of the first bit in the bit sequence of both the first and second kinds of data elements is "0", and the data block generated by the data-block generating portion includes two blocks, in one of which are arranged codes corresponding to the first bits and in the other of which are arranged codes corresponding to the last bits.

4. The data transmitting apparatus according to claim 2, wherein the value of the first bit in the bit sequence of both the first and second kinds of data elements is "1", and the data block generated by the data-block generating portion includes two blocks, in one of which are arranged codes corresponding to the first bits and in another of which are arranged codes corresponding to the last bits.

5. The data transmitting apparatus according to claim 1, wherein the bit sequence of each of the data elements is of three bits, and the value of each bit in one of (i) a pair consisting of a first one and a second one of the three bits and (ii) a pair consisting of the second one and a last one of the three bits in the bit sequence of the first kind of data element is the same as that of the corresponding bit in the bit sequence of the second kind of data element.

6. The data transmitting apparatus according to claim 5, wherein the value of the first and second bits in the bit sequence of both the first and second kinds of data elements is "0", and the data block generated by the data-block generating portion includes three blocks in a first one of which are arranged codes corresponding to the first bits, in a second one of which are arranged codes corresponding to the second bits, and in the rest of which are arranged codes corresponding to the last bits.

7. The data transmitting apparatus according to claim 1, wherein the raw data includes at least image data which represents an image.

8. The data transmitting apparatus according to claim 7, wherein the transmitting portion transmits the compressed file to an image forming apparatus which forms an image on the basis of the image data.

9. The data transmitting apparatus according to claim 8, wherein the image forming apparatus is an image recording apparatus which records an image on a recording medium.

10. The data transmitting apparatus according to claim 9, wherein the image recording apparatus is of line type which includes a feeding device feeding the recording medium in a feeding direction and at least one recording head of line type extending perpendicular to the feeding direction.

11. The data transmitting apparatus according to claim 10, wherein the image recording apparatus comprises a inkjet recording device including at least one line-type inkjet head having a plurality of nozzles from each of which a droplet of ink is ejected onto the recording medium so as to record the image thereon by forming a plurality of image dots constituting the image,
   and wherein each of the data elements includes a dot data element, which is a bit sequence of a plurality of bits and is one of a plurality of sorts respectively corresponding to the kinds of data elements and to different amounts of ink to be ejected to form the image dots.

12. The data transmitting apparatus according to claim 11, wherein the bit sequence of each of the dot data elements is of two bits, and the value of one of a first one and a last one of the two bits in the bit sequence of a first one of the sorts of dot data elements which corresponds to the first kind of data element is the same as that of the corresponding one of the first and last bits in the bit sequence of a second one of the sorts of dot data elements which corresponds to the second kind of data element.

13. The data transmitting apparatus according to claim 12, wherein when the bit having the same value between the first and second sorts of dot data elements is the first bit, the value of the first bit is "0", and when the bit having the same value between the first and second sorts of dot data elements is the last bit, the value of the last bit is "1", and the data-block generating portion generates the data block by splitting each of the dot data elements into the first bit and the last bit, and then arranging codes corresponding to the first bits of all the dot data elements and codes corresponding to the last bits of all the dot data elements in respective series each corresponding to an order of disposition of the nozzles in the at least one inkjet head.

14. The data transmitting apparatus according to claim 13, wherein the at least one inkjet head includes a plurality of inkjet heads corresponding to respective colors, and each of the inkjet heads has at least one group of nozzles, and wherein the arranging the codes corresponding to the first bits and the codes corresponding to the last bits in respective series is implemented such that in each of the series of codes, codes corresponding to nozzles at a same place in the order of disposition of the nozzles in the respective groups of nozzles in the respective inkjet heads are consecutively arranged, and the thus obtained consecutive arrangements are sequenced in the order of disposition of the nozzles.

15. The data transmitting apparatus according to claim 11, wherein the bit sequence of each of the dot data elements is of three bits, and the value of each bit in one of (i) a pair consisting of a first one and a second one of the three bits and (ii) a pair consisting of the second one and a last one of the three bits in the bit sequence of the first sort of dot data element corresponding to the first kind of data element is the same as that of the corresponding bit in the bit sequence of the second sort of dot data element corresponding to the second kind of data element.

16. The data transmitting apparatus according to claim 15, wherein the bits each having the same value between the first and second sorts of dot data elements are either one pair of the first and second bits both of whose values are "0" and the second and last bits both of whose values are "1", and the data-block generating portion generates the data block by splitting each of the dot data elements into the first bit, the second bit, and the last bit, and then arranging codes corresponding to the first bits of all the dot data elements, codes corresponding to the second bits of all the dot data elements, and codes corresponding to the last bits of all the dot data elements, in respective series each corresponding to an order of disposition of the nozzles in the at least one inkjet head.

17. The data transmitting apparatus according to claim 16, wherein the at least one inkjet head includes a plurality of sets of inkjet heads, which correspond to respective colors, and each of which includes at least one inkjet head each of which has at least one group of nozzles, and wherein the arranging the codes corresponding to the first bits, the codes corresponding to the second bits, and the codes corresponding to the last bits, in respective series, is implemented such that in each of the series of codes, codes corresponding to nozzles at a same place in the order of disposition of the nozzles in the respective groups of nozzles in the respective inkjet heads are consecutively arranged in the order of disposition of the nozzles.

18. A non-transitory storage medium storing a program to be executed by a computer of a data transmitting apparatus for transmitting data including a plurality of data elements, each of which is a bit sequence of a plurality of bits, and is of one of a plurality of kinds, at least one bit in the bit sequence of a first one of the kinds of data elements that most frequently occurs having the same value as a bit at a corresponding place in the bit sequence of a second one of the kinds of data elements that second most frequently occurs, the program causes the computer to function as:

a data-block generating portion which generates a data block, from raw data to be transmitted which is stored in a raw-data storing portion, by rearranging the bit sequences of the data elements of the raw data such that the bits at the same place in the respective bit sequences as each of the at least one bit are arranged in a series in the data block;

a data compressing portion which creates a compressed file by compressing the data block generated in the data-block generating portion; and a transmitting portion which transmits the compressed file created in the data compressing portion.

* * * * *